Aug. 23, 1927.
J. B. WEBB
1,639,758
OVERHEAD LOADING MECHANISM
Filed Feb. 12, 1925  4 Sheets-Sheet 3
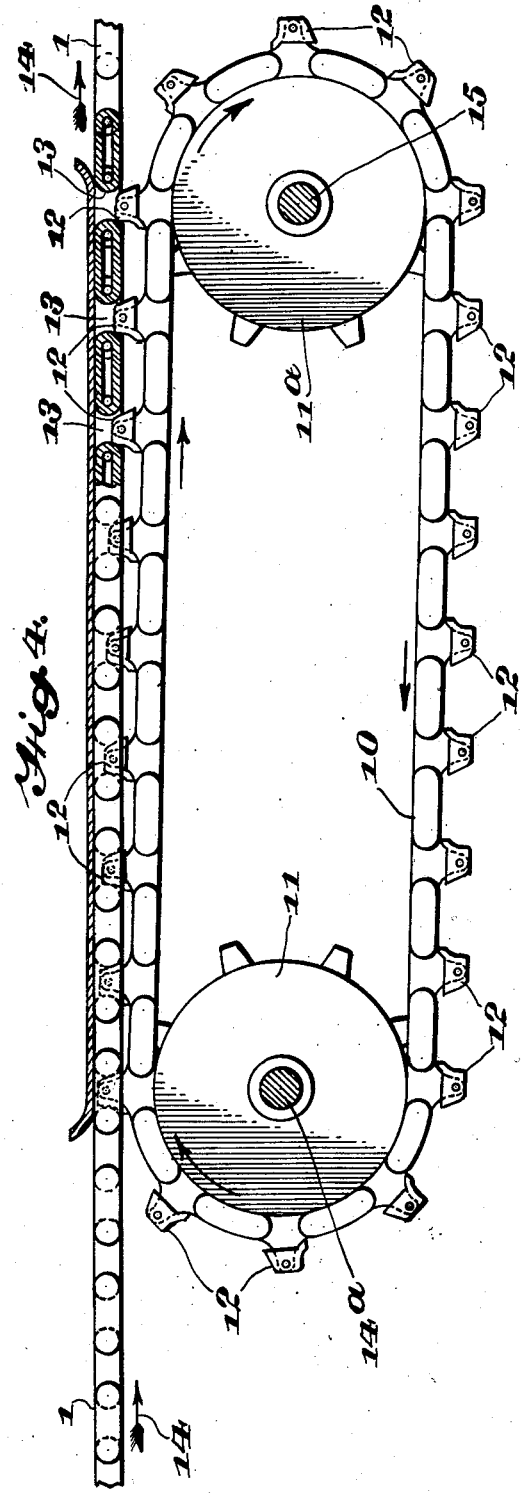
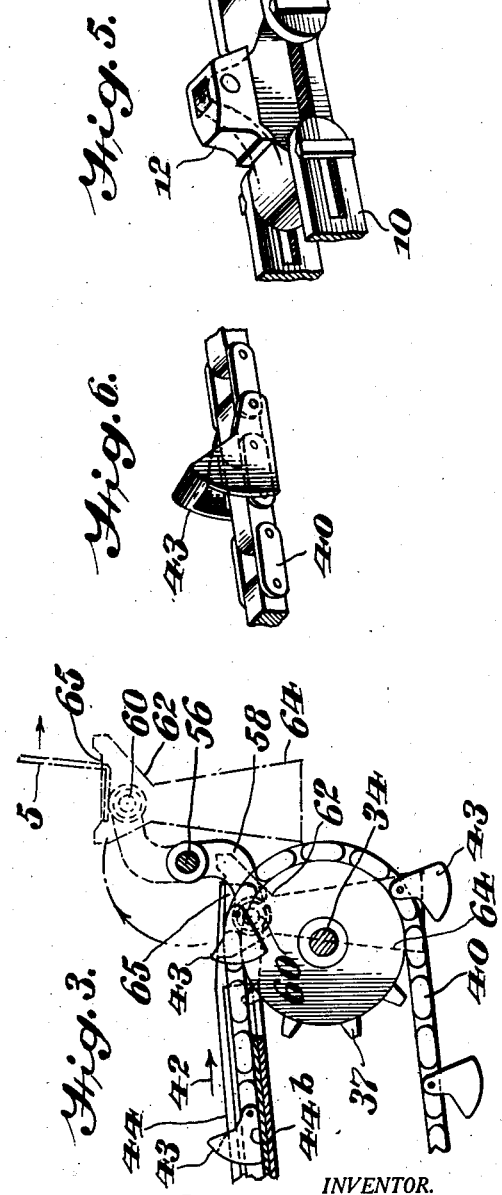
INVENTOR.
Jervis B. Webb
BY
Cyrus N. Anderson
ATTORNEY.

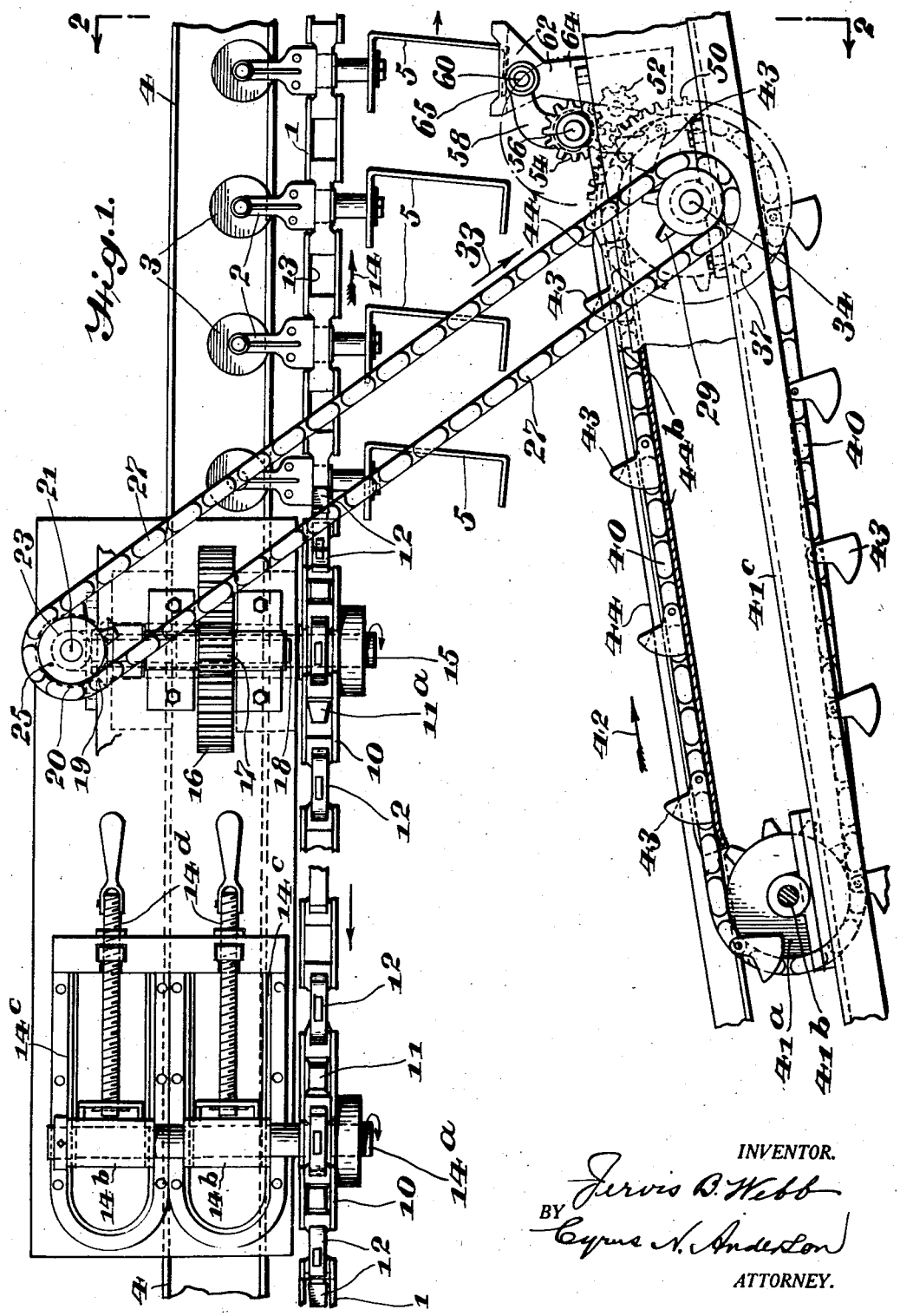

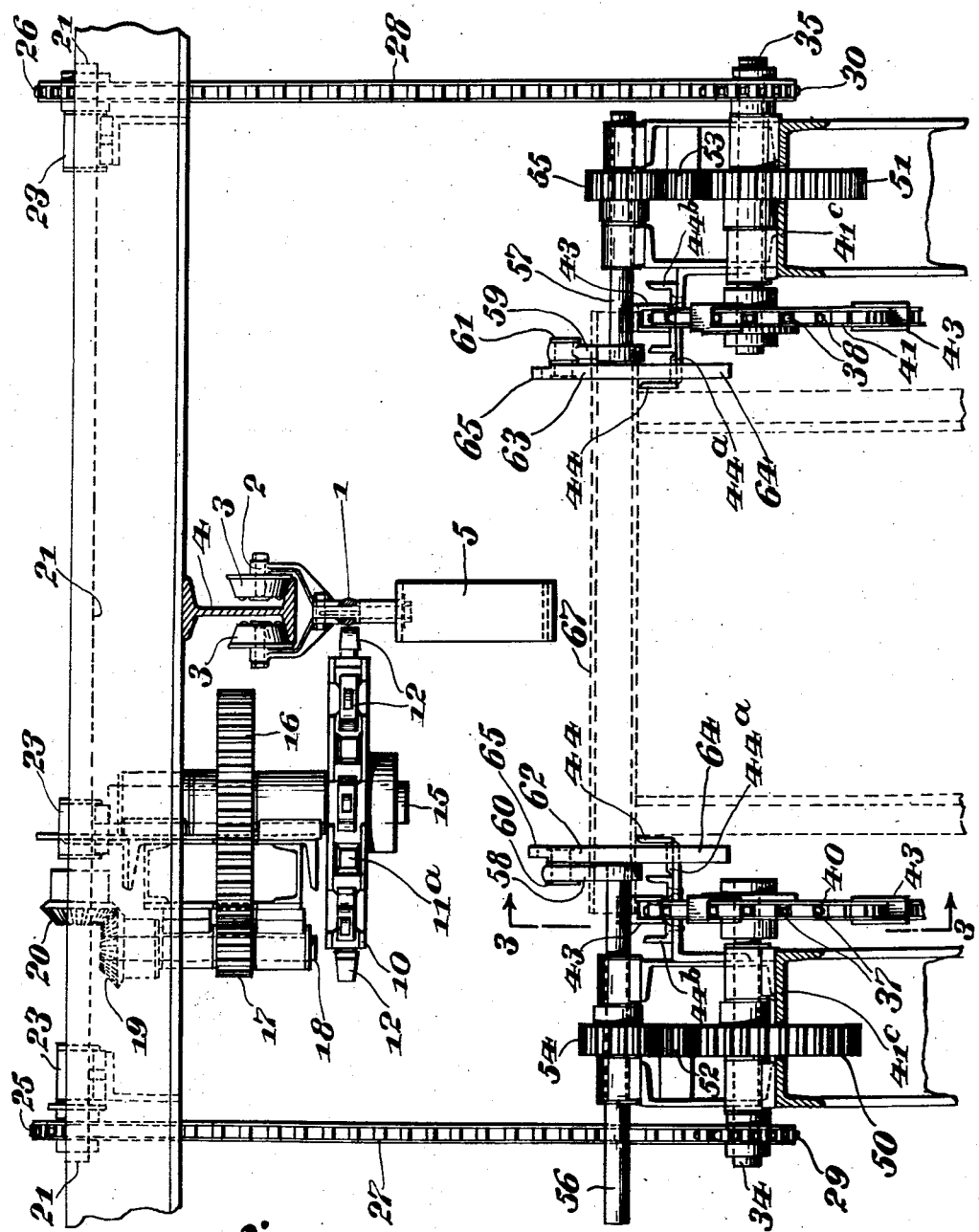

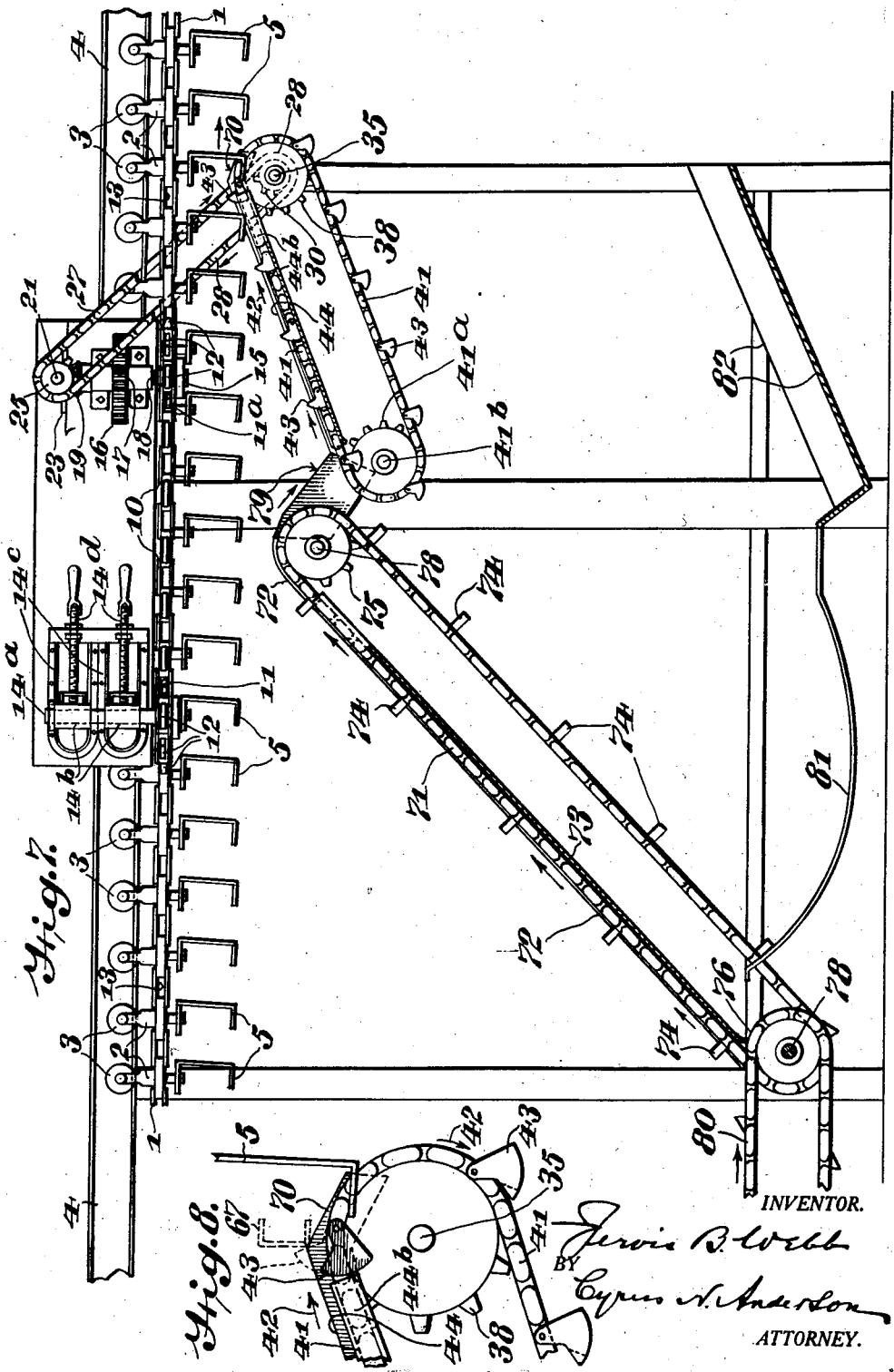

Patented Aug. 23, 1927.

1,639,758

UNITED STATES PATENT OFFICE.

JERVIS B. WEBB, OF DETROIT, MICHIGAN.

OVERHEAD LOADING MECHANISM.

Application filed February 12, 1925. Serial No. 8,607.

In manufacturing plants overhead conveyers are in quite general use for conveying articles from one point to another therein, and it is a desideratum that practical and economical mechanism be employed for loading said articles onto such conveyers.

The present invention relates to mechanism of the character indicated which is particularly adapted for use in plants wherein automobiles are manufactured, although it is to be understood that the invention is not limited to means for loading parts of automobile structures but may be adapted for use in the loading of various kinds of objects and devices onto overhead conveyers.

The general object of the invention is to provide novel means for loading the chassis of automobiles onto supporting devices or elements carried by endless conveyers,—usually chain conveyers.

It is also an object of the invention to provide novel mechanism of the character indicated in which the object to be loaded onto a moving elevated conveyer is carried into position such that some portion thereof is located above an element of the conveyer structure by which it is to be engaged and supported and thereafter automatically deposited upon said element.

Another object of the invention is to provide means whereby the conveyer is adapted to operate the loading mechanism to cause movement of the parts thereof synchronously with the said conveyer whereby objects are adapted to be transferred automatically from the said loading mechanism onto the load supporting elements of the conveyer.

Other objects and advantages are incident to the invention but no attempt will be made at this point to enumerate all of the various objects and advantages thereof but such objects and advantages will be referred to in the detailed description which follows or will be apparent therefrom.

In order that the invention may be readily understood and its practical advantages fully appreciated reference may be had to the accompanying drawings in which I have illustrated apparatus embodying the principle of the invention. However, it will be understood that the invention is susceptible of embodiment in other forms of construction than those shown and that various changes in the details of construction may be made within the scope of the claims without departing from the invention.

In the drawings:

Fig. 1 is a view partly in vertical section and partly in side elevation of a portion of an endless conveyer means and mechanism for loading objects, such as the chassis of automobiles, upon the load supporting elements of the said conveyer;

Fig. 2 is a view taken on the line 2—2 of Fig. 1;

Fig. 3 is a vertical sectional elevational view of a fragmentary portion of the loading mechanism taken on the line 3—3 of Fig. 2;

Fig. 4 is a horizontal sectional plan view showing means whereby the loading mechanism is adapted to be operated by the conveyer;

Fig. 5 is a perspective view of a fragmentary portion of the drive chain interposed between a portion of the conveyer chain and the loading mechanism and by means of which the latter is operated;

Fig. 6 is a perspective view of a fragmentary portion of one of the sprocket chains constituting a part of the loading mechanism;

Fig. 7 is a view partly in longitudinal vertical section and partly in elevation of a portion of overhead conveyer structure and showing a modified construction of loading means; and Fig. 8 is a view in side elevation of a fragmentary portion of the loading mechanism shown in Fig. 7 the said view being enlarged as compared with the showing in Fig. 7 for the purpose of illustrating more clearly certain features of construction.

Referring to the drawings: 1 designates an endless chain conveyer provided at intervals with trolley supports 2 having wheels 3 which engage the upper sides of the lower flanges of I-beams 4, only one of which is shown. These I-beams are supported in the usual manner. The trolley supports 2 are provided with what may be referred to as hooks 5 which depend from the conveyer, as is indicated in Figs. 1 and 7 of the drawings. Only a limited number of the trolley supports and hooks are shown in Fig. 1 but it will be understood that these trolley supports and hooks may be located at intervals throughout the length of the conveyer. A drive sprocket chain 10 is supported by sprocket wheels 11 and 11ᵃ in adjacent operative relation to the conveyer chain 1. The sprocket chain 10 is provided with pivoted contact dogs 12, which dogs are adapted to project into the spaces 13 provided at intervals in the conveyer chain 1. The conveyer chain travels in the direction indicated by the arrow 14 in Fig. 4. As will be apparent from an inspection of Fig. 4 of the drawings, the sprocket wheels 11 and 11ᵃ are located unequal distances from the adjacent portions of the conveyer chain 1, the sprocket wheel 11 being located nearer to the said conveyer chain than the sprocket wheel 11ᵃ. As a result of this relationship the dogs 12 immediately adjacent the sprocket wheel 11 are adapted to be fully engaged by the chain 1, but as the latter moves forward toward the sprocket wheel 11ᵃ the dogs are gradually disengaged from the said chain so that separation of the conveyer chain from the drive chain is effected without objectionable strains tending to distort either of the chains.

The shaft 14ᵃ upon which the sprocket wheel 11 is supported is mounted in bearings 14ᵇ which in turn are slidably mounted upon guide supports 14ᶜ and are adapted to be adjusted by means of the screw threaded adjusting means 14ᵈ so as to control the condition of the drive chain 10 as to its slackness or tautness.

The shaft 15 upon which the sprocket wheel 11ᵃ is mounted is provided with a relatively large spur gear 16 which engages a pinion 17 upon a shaft 18 which is provided at its upper end with a bevel pinion 19 which is in engagement with a bevel pinion 20 upon a shaft 21 which extends transversely across the apparatus as shown in Fig. 2 and is supported in bearings 23. The said shaft is provided adjacent its opposite ends with sprocket wheels 25 and 26. Sprocket chains 27 and 28 are supported upon these sprocket wheels and oppositely disposed sprocket wheels 29 and 30. Driving of the shaft 21 operates the sprocket wheels 25 and 26 to operate the sprocket chains 27 and 28 in the direction indicated by the arrows 33 and also to operate the sprocket wheels 29 and 30. The out-board shafts 34 and 35 upon which the sprockets 29 and 30 are mounted are rotated in a clockwise direction. The shafts 34 and 35 are provided with sprocket wheels 37 and 38 upon their inner ends upon which the upper end portions of loading sprocket chains 40 and 41 are mounted. The opposite portions of the sprocket chains 40 and 41 are supported upon sprocket wheels 41ᵃ mounted upon shafts 41ᵇ which are supported in bearings supported upon the upper sides of channel members 41ᶜ. The rotation of the shafts 34 and 35 and of the sprocket wheels 37 and 38 thereon causes traveling movement of the sprocket chains 40 and 41 in the direction indicated by the arrows 42.

The sprocket chains 40 and 41 are provided at intervals with pivoted dogs 43 which are adapted to assume the positions indicated in Figs. 1 and 7 of the drawings. In the position as shown upon the upper portions or sections of the said chains the said dogs are adapted to contact with the portions of objects which are being elevated, which project over the chains and which are supported by the upper edges of the vertical flanges 44 of angle members, as clearly indicated in Fig. 2 of the drawings. The outer edges of the horizontal flanges 44ᵃ of the said angle members are located in adjacent relation to the inner sides or edges of channel members 44ᵇ within which the upper section or portion of the sprocket chains 40 and 41 operate and by which they are supported.

In the construction as illustrated in Figs. 1 to 6 inclusive the shafts 34 and 35 are provided with relatively large spur gears 50 and 51, which gears mesh with intermediate gears 52 and 53. The latter gears mesh with or engage gears 54 and 55 mounted upon short shafts 56 and 57 upon the inner ends of which arms 58 and 59 are mounted, which arms are of elbow shape as indicated in Fig. 1. The outer ends of these arms are provided with pins or studs 60 and 61 upon which lifting members 62 and 63 are pivotally mounted. These members are provided with extensions 64 and 65 which are relatively heavy and which operate to maintain the said members in vertical position with the load engaging ends 65 thereof at the top. The arms 58 and 59 rotate in clockwise direction, as indicated in Fig. 1 of the drawings. As they move upwardly the top ends of the members 62 and 63 engage the portions of the objects, such as the chassis of automobiles, as indicated in dotted lines at 67 in Fig. 2 of the drawings. The upper ends of the members 62 and 63 engage portions of one of the end members of a chassis frame which project beyond the vertical flanges 44 of the angle members. It will be observed upon reference to the drawings that the vertical flanges project beyond the horizontal flanges of the said angle members and that the upper ends of the latter terminate a sufficient distance from the shafts 56 and 57 to permit upward passage of the outer ends of the arms 58 and 59 together with the pivotally supported lifting members carried thereby into position to engage the outer projecting end portions of one of the end members of the chassis frame and lift the same so as to carry it into position above the lower end of one of the trolley hooks 5. As the arms 58 and 59 continue their rotation they move downwardly, as will be apparent upon an inspection of Fig. 1, and in their downward movement they operate to deposit a portion of the chassis frame or other article being loaded upon said hooks. The latter are traveling to the right as are the arms 58 at the time of such deposit, in consequence of which the deposited chassis frame or other article is supported by the said hooks and is conveyed thereby to the right, having reference to Fig. 1 of the drawings, away from the loading means.

It will be understood that at the time a chassis or other article is deposited upon a hook it is suspended in a substantially vertical position.

These chassis frames or other articles to be loaded are delivered to the sprocket chains 40 and 41 by any suitable mechanism. They may be delivered to said sprocket chains directly after having been painted or after any other operation following which it is desirable or necessary to convey the same by conveyer means to some other point in the plant.

Referring now to Figs. 7 and 8 of the drawings, it will be observed that certain parts of the construction illustrated in the previous figures of the drawings for depositing the object, such as the chassis frame of an automobile, upon the hooks 5 have been eliminated. In the said Figs. 7 and 8 the shafts 34 and 35 are elevated so that the pitch lines of the teeth of the sprocket wheels 37 and 38 extend a short distance, say about two inches, above the lower ends of the load supporting hooks 5 so that when the load passes from the upper edges of the vertical flanges 44 of the angle plates or members previously referred to it will descend onto the load supporting hooks and be conveyed thereby away from the loading mechanism. It will be seen that the upper ends of the vertical flanges 44 of the said angle plates or members extend beyond the upper ends of the horizontal flanges 44ª of said plates or members and that the upper edges of the upper end portions of the said vertical flanges are inclined downwardly, as shown at 70, to facilitate the discharge of the load onto whichever of the hooks 5 may be present to receive it.

It will be understood that in the employment of the loading mechanism the loading sprocket chains are operated or moved synchronously with respect to the conveyer chains and the load supporting and carrying hooks thereon, so that upon the discharge of an article from the loading means a supporting hook will be present to receive the same and convey it away from the said loading mechanism.

The upper forward edges of the dogs 43 engage the portions of the load which may be supported on the upper edges of the vertical flanges 44 of the angle plates or members and push them upwardly thereon until they are delivered onto the downwardly inclined portions 70 from which they are discharged onto the hooks 5. After the portions of the article being loaded which contact with the upper edges of the vertical flanges 44 of the angle plates or members have been moved onto the inclined portion 70 from which they are adapted to slide by gravity onto the loading hooks 5, the dogs 43 collapse and pass underneath the said portions of the load, as will be apparent from an inspection of Figs. 7 and 8 of the drawings.

The articles to be loaded are delivered onto the upper edges of the vertical flanges 44 previously referred to from sprocket chains 71 (only one of which is shown) located at opposite sides of the structure in longitudinal alinement with the sprocket chains 40 and 41. Portions of the articles to be loaded are supported upon the upper edges of the vertical inside flanges 72 of channel members 73 and are moved forward by the engagement therewith of the projections 74 located at intervals upon the sprocket chains 71. These sprocket chains are supported upon sprocket wheels 75 and 76 mounted upon shafts 78 which are mounted and supported in suitable bearings, not shown. The portions of the articles which are being loaded, such as the chassis frame of an automobile, after being discharged from the upper edges of the flanges 72, are guided and supported by the connecting guiding means 79 onto the upper edges of the vertical flanges 44 previously referred to. The articles to be loaded are delivered to the sprocket chains 71 by sprocket chains 80 only one of which is shown.

In order to control the lower ends of the articles being loaded and to prevent abrupt swinging of the same as they pass from any supporting means which may be associated with the sprocket chains 80 I have provided the supporting and guiding means 81 along which the lower ends of the said articles are adapted to be dragged. As the articles to be loaded pass from the control of the sprocket chain 71 into control of the sprocket chains 40 and 41 the lower ends are guided and controlled by the supporting and guiding means 82 until they are finally discharged from the upper edges of the vertical flanges 44 onto the load supporting hooks 5.

Such guiding and supporting means for the lower ends of the articles to be loaded are not disclosed in the previous figures of the drawings, but it will be understood that such guiding and supporting means may be employed, if desired, in connection with the construction as disclosed in said figures.

It will be seen that by my invention I have provided a novel construction of loading means whereby articles, particularly the chassis of automobiles, may be loaded onto overhead conveying means very expeditiously and without the necessity of the presence of an operative for manually controlling the loading operation. In other words, the mechanism is automatic in character and is adapted to convey articles which may be delivered thereto and deposit the same onto overhead conveyers by which they may be conveyed to some desired destination.

Having thus described my invention, what I claim and desire to secure by Letters Patent is:

1. In overhead loading apparatus, the combination of an overhead endless traveling conveyer chain having supporting hooks depending at intervals therefrom, means for elevating objects into position adjacent the line of travel of said supporting hooks, driving means intermediate the said conveyer and the said elevating means, means actuated by the said conveyer for actuating the said driving means to operate the said elevating means, and means for removing said objects from said elevating means into the line of travel of said hooks and in rear of the hooks onto which the respective objects are to be deposited and for thereafter depositing the same on said hooks.

2. In overhead loading mechanism, the combination of an endless overhead conveyer having load supporting means located at intervals thereon, an endless elevating conveyer for elevating objects into position to be loaded onto said supporting means, the said elevating conveyer being located in a plane a substantial distance below the said overhead conveyer, an endless drive member interposed between the said overhead conveyer and the said elevating conveyer, means whereby said endless drive member is driven by the said overhead conveyer to drive the said elevating conveyer, means whereby objects are adapted to be delivered onto said elevating conveyer and conveyed thereby to the upper end thereof, and continuously revolving means adapted to engage the said objects successively and lift the same from the said elevating conveyer into the line of movement of the said load supporting means upon the said overhead conveyer in rear of appropriate load supporting means and for depositing the same upon the latter.

3. In overhead loading mechanism, the combination of an overhead endless chain conveyer provided with load supporting means at intervals, an endless conveyer for elevating objects into operative relation to the said load supporting means, an endless drive chain engaged and driven by the said overhead conveyer, means driven by the said drive chain for actuating the said elevating conveyer means and means operating to lift objects from said elevating means into positions in the line of travel of and in rear of appropriate load supporting means and for thereafter depositing the same on said means.

4. In overhead loading mechanism, the combination of an overhead endless conveyer provided at intervals with load-supporting means, endless elevating means located at opposite sides of the mechanism for elevating objects to be loaded into operative relation to the said supporting means, means for supporting the said endless elevating means, means intermediate the last mentioned means and the said overhead endless conveyer for actuating the former in synchronism with the movement of the said overhead endless conveyer and continuously revolving means for removing objects from said elevating means and depositing the same onto the said supporting means carried by the said overhead endless conveyer.

5. In overhead loading mechanism, the combination of an overhead traveling conveyer provided with supporting means at intervals, a pair of upwardly inclined endless conveyers located in operative relation to the said overhead conveyer, one of said upwardly inclined endless conveyers being located at one side of the mechanism and the other being located at the opposite side thereof, means for causing movement of said upwardly inclined endless conveyers in synchronism with the movement of the said overhead conveyer, means for delivering objects to be loaded onto said upwardly inclined endless conveyers and means continuously revoluble in the direction of travel of said overhead conveyers for engaging and delivering said objects from the control of said conveyers to the said supporting means.

6. In overhead loading mechanism, the combination of an overhead traveling conveyer provided with means at intervals for supporting objects to be delivered thereto, a pair of upwardly inclined endless elevating means, one of which is located at one side of the said mechanism and the other at the opposite side thereof, means located in adjacent relation to the said endless elevating means for slidably supporting objects to be loaded, means carried by the said endless elevating means for engaging the said objects to cause upward sliding movement thereof, means for actuating the said endless elevating means in synchronism with the said overhead traveling conveyer and means whereby the said objects may be deposited upon the said supporting means.

7. In overhead loading mechanism, the combination of an overhead endless chain conveyer provided with load supporting means at intervals thereon, upwardly inclined endless elevating chains, one of which is located at one side of the mechanism and the other at the opposite side thereof, means located in adjacent relation to the said endless elevating chains for supporting objects to be loaded, means carried by the said endless elevating chains for contacting with said objects to effect upward sliding movement thereof, means intermediate the said endless overhead conveyer chain and the said endless elevating chains, which intermediate means is actuated by the said overhead endless conveyer chain for actuating the said endless elevating chains, and revolving means for engaging objects to be loaded and for depositing the same upon the said supporting means.

8. In overhead loading means, the combination of an overhead traveling conveyer provided with load-supporting means, means for elevating objects to be loaded and means revolving continuously in the direction of movement of said conveyer for lifting the said objects from the said elevating means and depositing the same upon the said load-supporting means.

9. In overhead loading means, the combination of an overhead traveling conveyer, means for elevating objects to be loaded and revolving arms adapted to engage the said objects and lift the same from the said elevating means to the said conveyer, the revolution of said arms being in the direction of movement of said conveyer.

In testimony that I claim the foregoing as my invention, I have hereunto signed my name this ninth day of February, A. D., 1925.

JERVIS B. WEBB.